July 4, 1967 R. C. AVERY 3,329,965

TROUBLE RECORDER

Filed July 16, 1965 2 Sheets-Sheet 1

July 4, 1967 R. C. AVERY 3,329,965

TROUBLE RECORDER

Filed July 16, 1965 2 Sheets-Sheet 2

INVENTOR.
ROBERT CAMBELL AVERY
BY
[signature]
ATTORNEY

United States Patent Office 3,329,965

Patented July 4, 1967

3,329,965

TROUBLE RECORDER

Robert Campbell Avery, San Juan, Puerto Rico, assignor to International Telephone and Telegraph Corporation Filed July 16, 1965, Ser. No. 465,509
2 Claims. (Cl. 346—107)

This invention relates to trouble recorders for use with complex electrical systems, and more particularly to trouble recorders for automatic telephone systems.

Electrical systems sometimes develop trouble conditions which maintenance personnel must find and correct. In small or simple equipment, it is fairly easy to close a circuit and watch the operation of the equipment to see where the faults occur. However, as the equipment becomes larger and more complex, it becomes difficult to observe all of the sequence of rapid operations which occur when a circuit closes. The problem is even more acute if the equipment must, if possible, remain in operation despite the trouble and during maintenance because the trouble circuit cannot be exercised.

An automatic telephone system provides one example of a large and complex equipment of the type described. An even more specific example is the marker used to control the telephone system. A typical marker might have in the order of 750 relays. If two or three such markers are coupled in parallel, perhaps there is a total of 2250 relays in a single system. If any one of these relays fails to operate properly, a maintenance record should be made to facilitate repair. Heretofore, the record making has required a complex computer-like device for making a punched card or similar record. This card punching device is a large and expensive trouble recorder which cannot be economically provided in a small exchange.

Accordingly, an object of the invention is to provide new and improved trouble recorders. In this connection, an object is to provide low cost trouble recorders which are economical enough to be used in a small exchange. More particularly, an object is to provide low cost trouble recorders which will not hold equipment out of service for more than a minimum period of time.

Another object of the invention is to provide trouble recorders which will make virtually instantaneous records of troubles as they occur. A further object is to make a clear, unambiguous, and easily understood record of all troubles.

In keeping with an aspect of the invention, these and other objects are accomplished by providing a trouble recorder for monitoring electrical equipment. The recorder has a lamp panel with a self-developing camera focused thereon. Each lamp in the panel is permanently wired to be lit when an associated circuit or component in the monitored equipment is active. If trouble occurs, the camera is tripped to make a picture of the lamps which are then lit on the panel. This way, maintenance people may study the picture to discover the equipment which is active or inactive at the wrong time and thereby learn the identity of the faulty equipment.

The above mentioned and other features of this invention and the manner of obtaining them will become more apparent, and the invention itself will be best understood by reference to the following description of an embodiment of the invention taken in conjunction with the accompanying drawings, in which.

Figure 1:
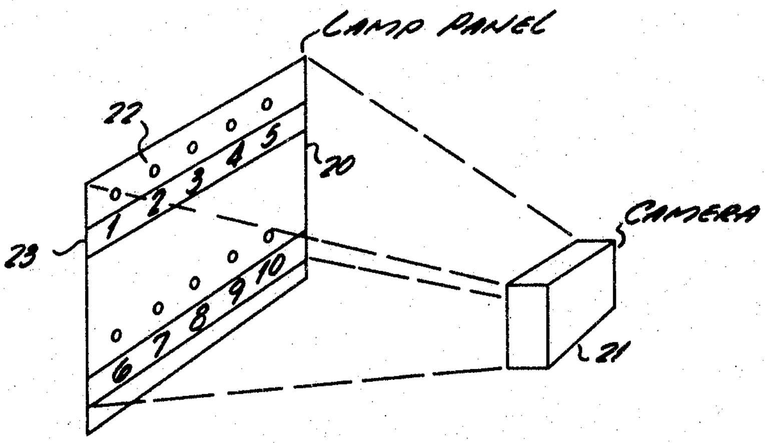
FIG. 1 is a block diagram showing the trouble recorder.

In greater detail, FIG. 1 shows a trouble recorder comprising a lamp or display panel 20 having a self-developing camera 21 focused thereon. A plurality of lamps (such as shown at 22) are distributed over the panel to display the active or inactive condition of the associated equipment. If, for example, the monitored equipment is a marker with 750 relays, the display panel will have 750 lamps. Preferably the lamps are arranged in strips. Adjacent each strip of lamps is an identification strip 23. Numbers, letters, or other indicia on the strips 23 identify each individual lamp. For example, FIG. 1 arbitrarily shows ten lamp bulbs; therefore, the indicia strips carry the numbers 1–10. These numbers should be large enough to be read in the photograph made by the camera 21.

Figure 2:
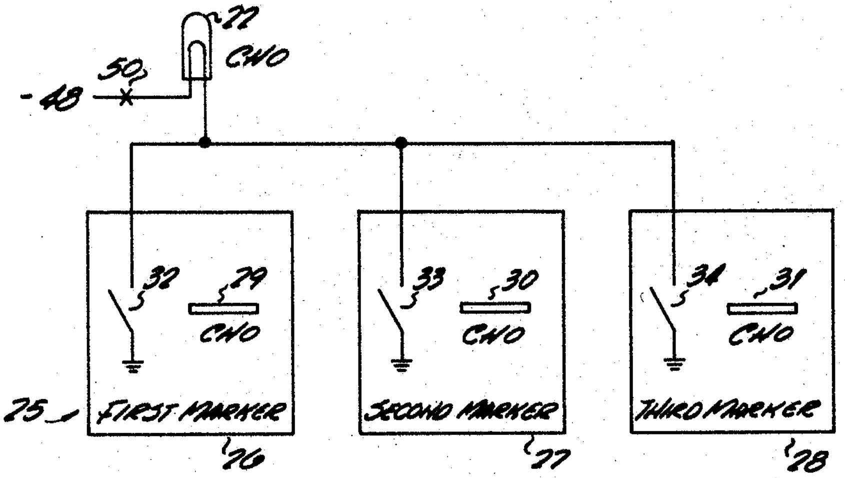
FIG. 2 is a schematic circuit diagram showing an exemplary circuit illustrating how the monitored equipment is wired into the lamp panel.

FIG. 2 illustrates how one exemplary lamp circuit is permanently wired to be lit when the monitored equipment or component is active. The circuit extends from monitored equipment 25 to lamp 22. By way of example, the monitored equipment 25 includes three identical markers 26, 27, 28. Each marker includes many components, one of which is a "CHO" relay; thus, there are three relays 29, 30, 31.

Each CHO relay has an operating circuit (not shown) for operating it according to the logic that is built into the marker. Also, each CHO relay has any number of contacts (also not shown) for performing any logic function required by the relay. In addition, each CHO relay also has an extra or monitor contact 32, 33, 34 wired into the display panel. Thus, for example, if relay 29 is active, contacts 32 close and ground is applied to light lamp 22. If, as assumed, each marker has 750 relays, there are 750 circuits similar to that shown in FIG. 2—each circuit extending from a differently designated relay to a correspondingly designated lamp. Obviously, the assumed circuit has 750 lamps.

Figure 3:
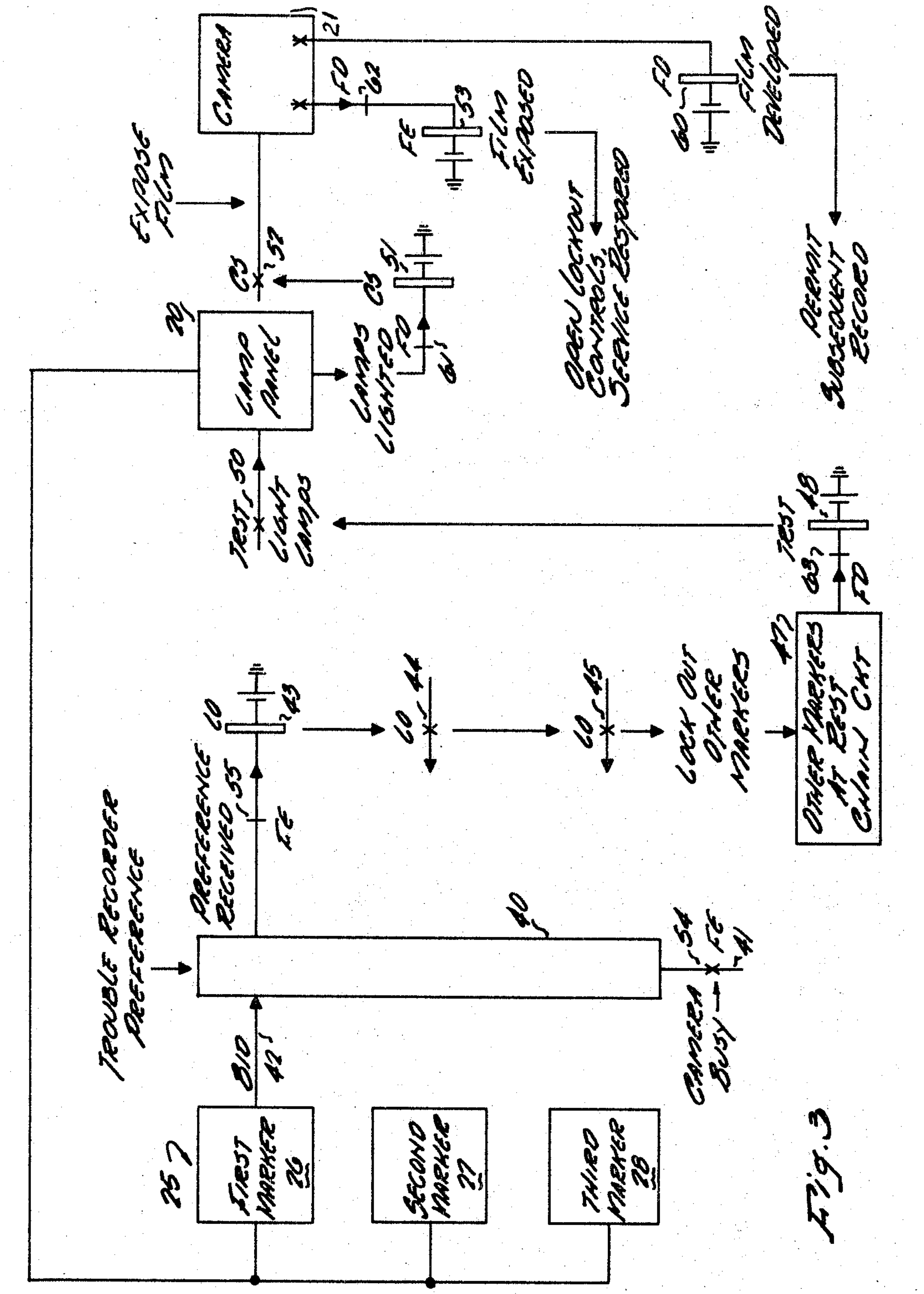
FIG. 3 is a block diagram showing how the trouble recorder and monitored equipment interact to provide a permanent record of trouble conditions.

The circuit for controlling the trouble recorder is shown in FIG. 3. This figure shows the lamp panel 20, camera 21, markers 25, and a preference circuit 40. Any suitable preference circuit may be used, such as a well known chain of counting relays, for example. The preference circuit is inhibited if a potential appears on the conductor 41 and is applied to the circuit 40.

If trouble occurs, the monitored equipment goes into an alarm condition and makes a bid for the trouble recorder. For example, if the marker 26 encounters trouble, it marks a bid lead 42. Likewise, if any other marker encounters trouble it energizes a similar lead to make a bid. Probably, none of the other markers 27, 28 is in a trouble condition and making a simultaneous bid at the time when the marker 26 makes its bid. If they are, the preference circuit 40 selects one of the bids and rejects the others until the selected marker can record its trouble.

After the preference circuit 40 has selected a marker to record a trouble condition, a lockout relay 43 operates. Responsive thereto, contacts 44, 45 close to lock out the other markers. If the other markers are in fact locked out of the trouble recorder, a chain circuit 47 closes to operate a relay 48. Relay 48 closes its contacts 50 (which also appear in FIG. 2) to allow lamps on the panel 20 to light.

Only marker 26 is associated with the panel 20 because relay 43 is operated. Therefore, only marker 26 can light the lamps to indicate those items and components which are active in the marker. With the closure of contacts 50, the camera relay 51 operates and contacts 52 close. Responsive thereto, the camera 21 takes a picture of panel 20 which is displaying lamps that are lit according to the active condition of the relays in the troubled marker 26. As the camera snaps its shutter, it operates a film exposed relay 53.

Relay 53 closes its contacts 54 and completes a circuit from conductor 41 to inhibit the preference circuit 40 and thereby prevent double connections to other markers.

Responsive thereto, marker 26 relases and no other monitored equipment 25 can seize the trouble recorder. Relay 53 also opens contacts 55 to release the lockout relay 43.

The camera automatically goes through its develop cycle as soon as it has snapped a picture. When the picture is developed, a film developed relay 60 operates.

Responsive to the operation of relay 60, the contacts 61 open to release the camera relay 51. Until this relay releases, the camera is inhibited from taking another picture. Contacts 62 open to release the film exposed relay 53. This in turn opens the contacts 54 and removes the inhibit from the preference circuit 40 while closing contacts 55 to enable the lockout relay 43. Finally, contacts 63 open to release relay 48 and extinguish the lamps on panel 20.

The trouble recorder circuit has returned to normal and is ready to record the next trouble. If there was a simultaneous demand for the trouble recorder, the preference circuit 40 connects the next marker to the lamp panel. If not, it waits until the next trouble occurs and a bid is made for a trouble recorder.

While the principles of the invention have been described above in connection with specific apparatus and applications, it is to be understood that this description is made only by way of example and not as a limitation on the scope of the invention.

I claim:

1. A trouble recorder for an automatic telephone system comprising a plurality of marker circuits having a plurality of electrical equipment therein, a display panel having a self-developing camera focused thereon, means for displaying on said panel the active or inactive conditions of said equipments, means responsive to trouble conditions in any one of said markers for coupling the troubled marker to light lamps on said panel, means for thereafter causing said camera to make a picture of the display panel, said equipments comprise a plurality of relays each having an extra set of monitor contacts thereon and said display panel includes a plurality of lamps, each of said lamps being connected to a parallel circuit including the monitor contacts on all corresponding relays in said markers, whereby said lamps light or go out responsive to the active or inactive condition of the corresponding relays, and means for selecting the troubled marker and connecting each lamp is said display circuit to the troubled marker while locking out the parallel circuit to the other markers.

2. The trouble recorder of claim 1 and means for retaining said lockout until after said camera completes its self-developing cycle.

References Cited

UNITED STATES PATENTS

| | | | |
|---|---|---|---|
| 2,392,890 | 1/1946 | Vincent et al. | 346—107 X |
| 2,516,189 | 7/1950 | Dinsmare | 346—107 X |
| 3,264,873 | 8/1966 | Svenson | 346—107 X |

RICHARD B. WILKINSON, *Primary Examiner.*

J. W. HARTARY, *Assistant Examiner.*